United States Patent
Lingafelt et al.

(10) Patent No.: US 7,099,341 B2
(45) Date of Patent: Aug. 29, 2006

(54) TRAFFIC ROUTING MANAGEMENT SYSTEM USING THE OPEN SHORTEST PATH FIRST ALGORITHM

(75) Inventors: Charles Steven Lingafelt, Durham, NC (US); Francis Edward Noel, Jr., Durham, NC (US); Ann Marie Rincon, Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 1057 days.

(21) Appl. No.: 10/137,785

(22) Filed: May 3, 2002

(65) Prior Publication Data

US 2003/0206528 A1    Nov. 6, 2003

(51) Int. Cl.
*H04L 12/28*    (2006.01)
(52) U.S. Cl. .................. 370/401; 370/235; 370/238
(58) Field of Classification Search .............. None
See application file for complete search history.

(56) References Cited

U.S. PATENT DOCUMENTS

| | | | |
|---|---|---|---|
| 3,748,441 A | 7/1973 | Halpern ................ 235/61.6 R |
| 4,325,440 A | 4/1982 | Crowley et al. ............. 177/25 |
| 4,350,970 A | 9/1982 | Von Tomkewitsch ........ 340/23 |
| 4,495,559 A | 1/1985 | Gelatt, Jr. et al. .......... 364/148 |
| 4,760,530 A | 7/1988 | Liden ........................ 364/442 |
| 4,795,892 A | 1/1989 | Gilmore et al. ............. 235/381 |
| 4,905,144 A | 2/1990 | Hansen ...................... 364/200 |
| 5,329,449 A | 7/1994 | Tanizawa et al. ...... 364/424.02 |
| 5,430,831 A | 7/1995 | Snellen ..................... 395/133 |
| 5,448,485 A | 9/1995 | Ishibashi et al. ............ 364/443 |
| 5,596,719 A * | 1/1997 | Ramakrishnan et al. .... 709/241 |
| 5,699,369 A | 12/1997 | Guha .......................... 371/41 |
| 5,764,508 A | 6/1998 | Harper et al. ............... 364/148 |
| 5,805,446 A | 9/1998 | Hatakeyama et al. ....... 364/148 |
| 5,831,860 A | 11/1998 | Foladare et al. ........ 364/478.07 |
| 5,881,243 A * | 3/1999 | Zaumen et al. ............. 709/241 |
| 6,021,402 A | 2/2000 | Takriti ........................ 705/412 |
| 6,178,362 B1 | 1/2001 | Woolard et al. ............ 700/295 |
| 6,182,005 B1 | 1/2001 | Pilley et al. ................ 701/120 |
| 6,195,609 B1 | 2/2001 | Pilley et al. ................ 701/120 |
| 7,031,288 B1 * | 4/2006 | Ogier ......................... 370/338 |
| 2003/0023750 A1 * | 1/2003 | Basturk ...................... 709/241 |
| 2003/0165117 A1 * | 9/2003 | Garcia-Luna-Aceves et al. 370/238 |

* cited by examiner

*Primary Examiner*—Duc Ho
(74) *Attorney, Agent, or Firm*—Joscelyn G. Cockburn; James A. Lucas

(57) ABSTRACT

A network processor is used for the routing of objects in non-data networking applications. The processor utilizes the Open Shortest Path First (OSPF) algorithm to capitalize on the benefits of data control for object traffic control and costs. A network processor is used at each point in a grid represented by intersecting paths. One or more routing tables are embedded in each network processor. Each routing table describes links with other network processors in the grid to which the network processor is interconnected. A cost factor is associated with each link and is constantly updated by the OSPF as new information becomes available. If a link or route becomes unavailable, the cost is set at infinity. The system then creates an alternative path for the object between a source and the desired destination that bypasses the unavailable link or route.

15 Claims, 3 Drawing Sheets

Network Processor

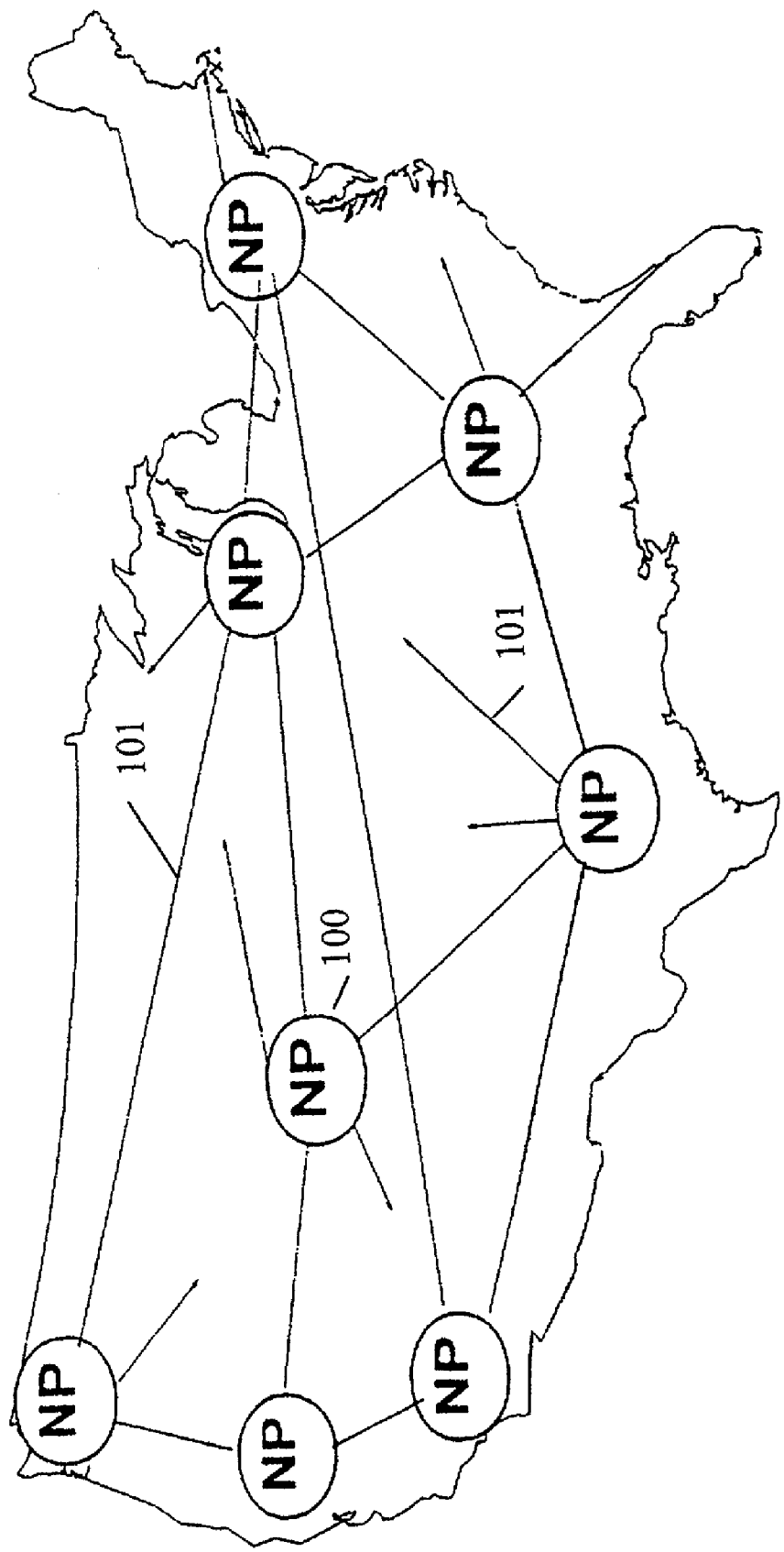
Figure 1: Network Processors Configured to Model an Airline or Postal System

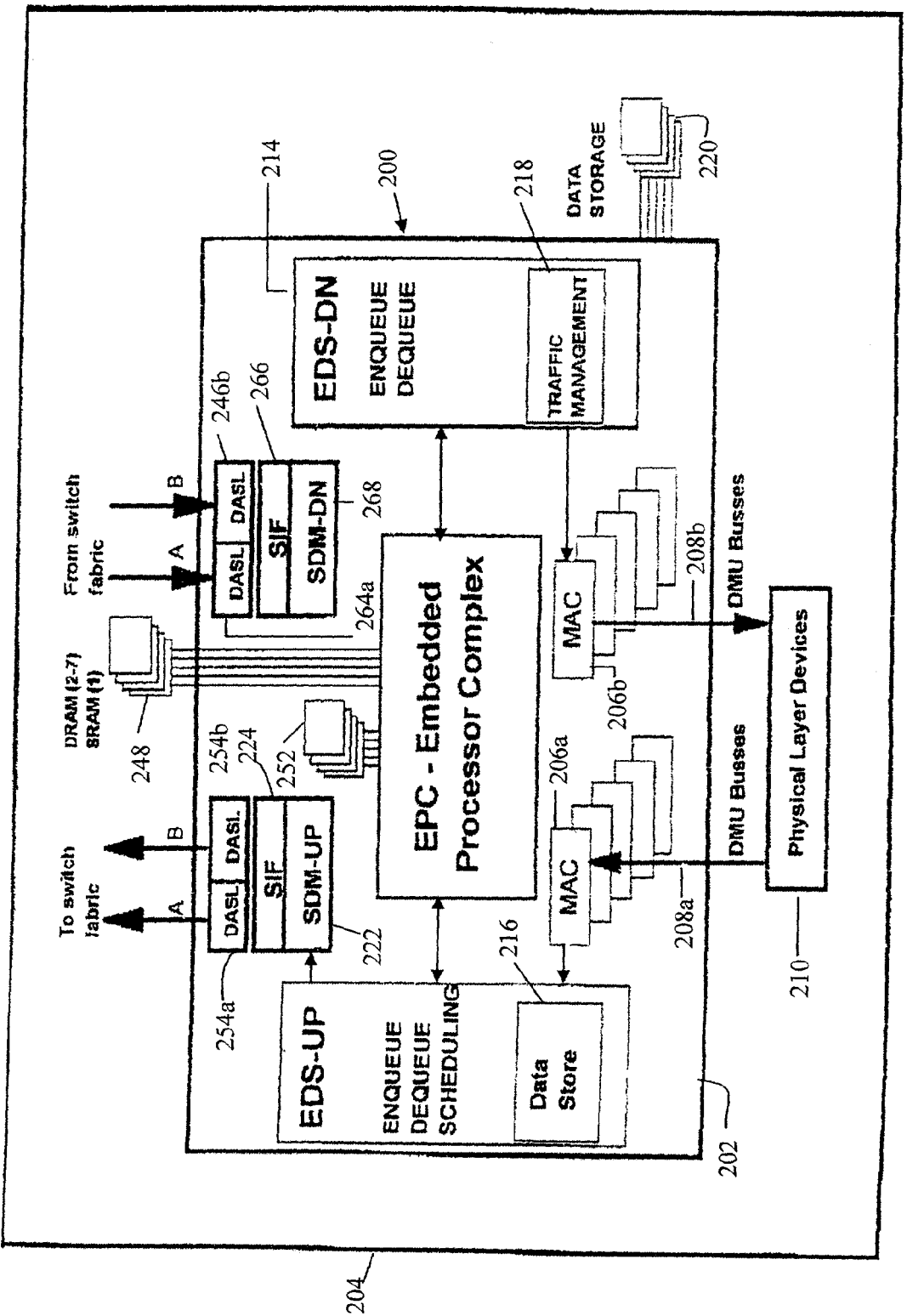
Figure 2: Network Processor

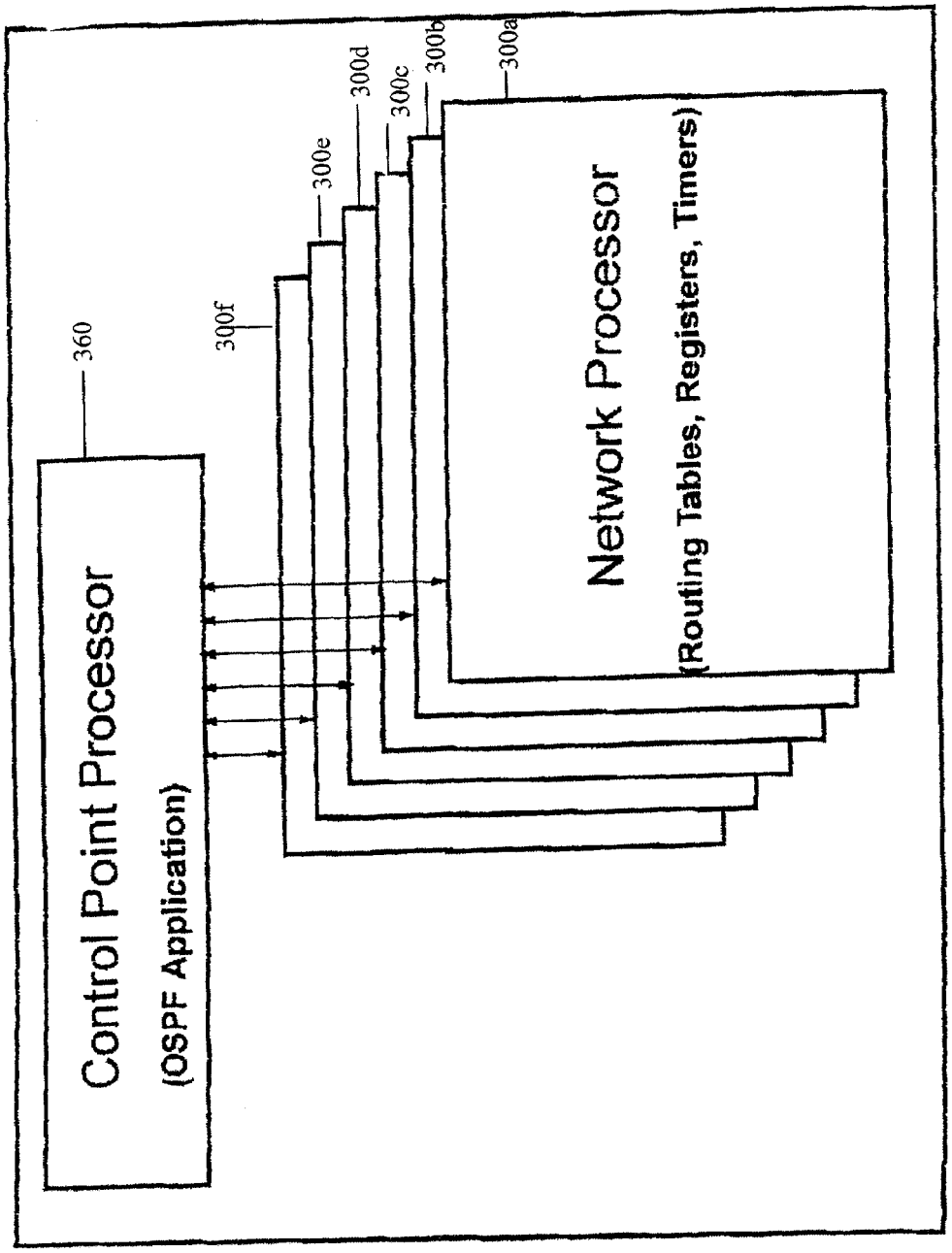
Figure 3: Hardware Architecture Supporting OSPF

TRAFFIC ROUTING MANAGEMENT SYSTEM USING THE OPEN SHORTEST PATH FIRST ALGORITHM

BACKGROUND OF THE INVENTION

1. Field of the Invention

This invention relates to the use, with or without a network processor, of an Open Shortest Path First algorithm for the efficient routing of people or other objects in non-data networking applications

2. Discussion of Related Art

The internet world is composed of a series of routers that route packets of information between a starting point and a destination. The packets typically are routed through a number of intermediate points or nodes. The internet is intended to be self-healing so that, if a router at one node becomes unavailable to relay the packets, one or more alternate routes will be located and used. The unavailability could be a 'soft' failure due, for example, to a problem of loading the packets into the router due to a noisy communication link, or an overload or congestion of traffic through the node. Or it could be a 'hard' failure, caused by electrical outages, a breakdown of equipment, an internet virus, terrorist attack or other causes resulting in a malfunctioning or failure of hardware or software at the router node.

An internet program or algorithm called Open Shortest Path First (OSPF) is widely used to route internet traffic from its origin to its destination along the most efficient path available. The OSPF is an algorithm that monitors all links out of a given router location, and updates the statistics on each link, based on the amount of throughput that the link is handling at a given time or within a specific time frame. A weighted cost factor for using each link is determined based primarily on this throughput and, periodically, all routers in the system share this cost information. This enables the internet to determine the most logical pathway for routing packets over the internet. The algorithm thus builds tables for each router that describe all of the links from one particular router to another, and denote which particular link would be most advantageous at a particular instant. The advantage can be based on the dollar cost, the shortest length of time to complete the transfer, the best routing for transporting the particular type or priority of information being transmitted, the routing with the highest security, or any number of other parameters. The algorithm is continuously collecting information on each router, and is updating its own routing tables, which it then shares with other routers.

In addition to updating and exchanging information with other routers, the OSPF software uses an error reporting protocol commonly referred to as an ICMP or Internet Control Message Protocol. This protocol provides a means for routers that encounter an error condition to report that condition to the original source. In addition to its reporting function, the ICMP may suggest possible actions that can be taken to correct the problem. It does not implement these changes but, rather, leaves it up to the source router or other programs or systems within the network to implement the changes.

Every router includes such a common control point function running OSPF. The router may have many dozens of network processors (NPs), interfacing with the control point, whose principal function is the routing of packets of information. Optimum utilization of the NP mandates that it not become bogged down with time consuming activities that are peripheral to its main function, such as what to do with a packet if the intended destination is not in the routing table. Such a data packet is forwarded to the control point function in which the OSPF software is running. The OSPF will then determine how to reach the designation. In some instances, the control point processor is part of the network processor, possibly embedded in the same chip as the NP. In larger router installations, the OSPF functions could be distributed to specific control processors, or could be handled by a central CPU (central processing unit) running the entire OSPF software.

The class of routing problems in the real world is very large compared with the limited problem of routing in an IP network. Examples include: 1) the US air traffic control system (statically configured); 2) truck routing (best effort!); and 3) parcel delivery (fixed hub and spoke system). These systems generally are so huge, and hence complex, that there is no CPU that is cost effective enough to provide dynamic solutions to these problems. Others have devised routing systems for such uses as vehicle traffic, air flight management, track layouts and package transit and delivery. Some of these are discussed in the following patents.

U.S. Pat. No. 4,350,970 (1982) describes a motor vehicle routing system based on current stationary routing stations. The system transmits routing information and location data between stationary points and individual vehicles.

U.S. Pat. No. 4,760,530 (1988) describes a flight management system for aircraft that provides flight profile commands to an aircraft based on predicted flight costs.

U.S. Pat. No. 5,329,449 (1994) relates to a vehicle control system for a multi-branching track layout. The system stores and utilizes data concerning, for example, branch points and their addresses, length, direction and turning radii of branches, and vehicle running speeds.

U.S. Pat. No. 5,448,485 (1995) describes a system for specifying a route for, e.g., railroad or road network, or a fluid piping layout. The system facilitates the input of route information.

U.S. Pat. No. 5,831,860 (1998) relates to a system for redirecting a package while in transit. A two-way pager and a paging antenna are used to contact an addressee, a comparison is made between the actual location and the address specified by the sender, and disparities resolved.

None of these systems or programs uses the robust real time capabilities of a network processor and OSPF for non-data routing uses.

BRIEF DESCRIPTION OF THE INVENTION

An object of this invention is to define a system whereby the network processor is used in non-networking routing applications, by applying the high performance capabilities of a Network Processor to the task of implementing the Internet Engineering Task Force (IETF) OSPF routing algorithm.

Another object is a method of extending the use of the OSPF routing algorithm to non-data networking applications utilizing the high-speed capabilities of a Network Processor.

These and other objects and advantages will become more readily understandable in light of the discussion that follows.

The present invention relates to a modeling system and method of moving an object along a path in a two or three dimensional network grid from a source to a destination according to the OSPF routing algorithm. This includes establishing network-processing capabilities at each node in a grid represented by intersecting paths. Each of the processing capabilities typically is represented by a network processor or its equivalent. A routing table is created for each network processor, the routing table comprising links with other network processors in the grid to which the network processor is interconnected. Additional links may be created in the routing table with endpoint locations in the grid to which each network processor is interconnected. A cost factor associated with each of the links is inserted into the table of each network processor. If an intersection becomes unavailable, the system sets the cost for links to that intersection at infinity. Finally, an alternative path is created for the object between the source and the destination, bypassing the unavailable intersection using the OSPF routing algorithm.

In another aspect of the invention, an object routing system includes a network processor for use with an OSPF routing algorithm to move the object along a path in a grid from a source to a destination. The network processor includes at least one MAC layer and wide bandwidth busses for delivering information between each MAC layer and one or more physical layer devices supported by the network processor. A specialized processor complex uses one or more routing tables generated by the OSPF algorithm. The input side of the NP processes data packets received by a MAC layer from a physical layer device, stores the headers from the packets and forwards the packets to a switch fabric to prioritize the export of the packet data. The output side of the NP receives data packets from the switch fabric, and includes a traffic management function. The traffic management function serves to route the packets through the MAC layer to one or more output ports according to a priority as directed by a switch fabric. Typically, the embedded processor complex is supported by SRAM and DRAM storage. It includes a scheduling data manager function for resolving conflict of packet addresses going to a switch fabric and for rerouting of packets from the switch fabric to the enqueue-dequeue down scheduler.

BRIEF DESCRIPTION OF THE DRAWINGS

FIG. 1 is an outline of the United States showing network processors configured to model an airline or postal system;
FIG. 2 shows the internal structure of a network processor; and
FIG. 3 shows the overall hardware and software architecture in a router.

DETAILED DESCRIPTION OF THE INVENTION

The invention can be described in simple terms with reference to an airline routing system. Hardware is constructed or assembled having a number of Network Processors 100, each one representing a hub in the airline system and appropriate interconnection links (See FIG. 1). This does not require an NP for each airport in the U.S. but may be limited to only those airports that act as interconnection points in the network. For example, Dallas, Chicago and JFK would have a dedicated NP. An NP would not be required to represent end of link airports, such as the Altoona Pa. Airport, which has no links except to the Pittsburgh Airport.

Each of the endpoint airports must be represented in the routing table of at least one NP; e.g. Altoona would be a link represented in the Pittsburgh routing table. Additionally, each NP would have a number of links 101 in its table, each representing the links that an airport has to other interconnection networks. For example, Pittsburgh's NP would show links to JFK, Chicago, San Francisco, etc. These link tables would be on the order of a couple hundred entries maximum. By comparison, data network NPs could have thousands of link entries.

Once this model is built, it is then necessary to initialize the system by loading into the tables, a cost associated with each link. The OSPF will then periodically update these tables. It is then straightforward for the model to initiate a flight (packet) from point A (Source) to point B (Destination) and then observe the path that the packet takes through the system of NPs (airports). To this point, the system replicates what the current airline system is able to do.

In accordance with the present invention, the next step presupposes that Chicago O'Hare Airport is shut down, for example, by heavy snow. At this point, all NPs with links to Chicago will have those links set to a cost equal to infinity. Within seconds, the model builds (using OSPF) a new optimum path for that flight that was going from RDU (Raleigh-Durham) to Seattle, through Chicago. Obviously, for flights that terminate in Chicago, there is no solution, just as when a router in an IP network fails, end nodes connected to that router are disconnected from that network until the router is brought back on line.

A network processor (NP) useful in the teachings of the present invention is shown in FIG. 2. The network processor 200 is embedded in a semiconductor chip 202 within an NP complex 204. The complex includes off-chip storage for the NP including DRAM and SRAM storage devices 248 and data storage 220. It also supports a plurality of physical layer devices 210, such as 10/100 Mbps and 1 Gbps Ethernet, 16 Mbps Token-Ring, 200 Mbps fiber channels, SONET (synchronous optical network) and the like.

Wide bandwidth busses 208a deliver information to and from the physical layer devices 210 and a plurality of Media Access Control (MAC) layers 206a. These MACs read the headers of the packets of data received from the physical layer devices 210, strip off the headers and send the packets and headers to an enqueue-dequeue scheduler (EDS-UP) 212 where the headers are retained in an on-site data store 216. The EDS-UP 212 sends the packets to the scheduling data manager-up (SDM-UP) 222 which has a serial interface (SIF) 224. The packet goes to one of two data-aligned serial interfaces (DASLs) 254a and 254b, through port A to a single switch fabric, or through ports A and B to two switch fabrics. The switch fabric(s) can be any of the types commonly in use, such as a crossbar, a shared memory, or a technology that may be proprietary to the user.

Packets are sent from the switch fabric(s) along a second set of serial ports A and B to another pair of DASLs 264b where they are distributed through an SIF 266 and SDM-DN 268 to the EDS-DN 214. The EDS-DN 214 is fairly complex and memory intensive. If the data packet is a broadcast packet, it is unlikely that multiple ports will be available at the same time. The EDS-DN 218 will keep a copy of the packet in the off-chip data storage 220, and copies will be sent to the MACs 206b paired to the MACs 206a and from there along the DMU busses 208b to the ports of the physical layer devices 210 as they become available, until all of the broadcast requirements have been fulfilled. The copy of the broadcast information in data storage 220 can then be discarded. Because this broadcast operation can take quite a while, the data storage 220 typically has a large storage capacity. The EDS-DN 214 also utilizes a traffic management 218 which serves to route the information traffic to the ports of the physical layer devices 210 according to the priority or the degree of importance of the information being transmitted.

The embedded Processor Complex (EPC) 246 may include several picoprocessors (not shown), each of which is multi-threaded, is equipped with its own support hardware, and has its own specialized function. The EPC employs one or more routing tables 252 that are on-chip for rapid look up time. The EPC looks at the IP headers from the incoming MAC layer 206a and compares them to the contents of the routing tables. These tables are updated periodically by the OSPF algorithm and provide key information that is prepended to the data packets. If the address of the packet, after removal of the MAC address, is not in the routing table, the EPC treats the packet as an exception and sends it via a private interface to the OSPF control point (not shown) in the Control Point Processor (CCP) or by going to the scheduling data manager (SDM) 222 which resolves any conflict of the packet addresses going to the switch fabric 250.

It should also be understood that each of the network processors may be represented by a simulator software package that will replicate real-life situations that might be handled by the NP. This would then eliminate the necessity of building specialized hardware to track a given scenario. For example, airlines could optimize airplane reservation problems by modeling the network by code on a simple workstation, or a large mainframe computer, depending on the user's choice. The various routing alternatives would be built up in a software model, and the OSPF would be run against that model to determine the best choice based on the cost factors that are used. The construction of such a software model is within the capability of the skilled programmer and is not intended to comprise an integral component of the present invention. Obviously, a hardware embodiment can be made to solve the same problem but at much greater financial cost and time.

Turning now to FIG. 3, shown is the hardware architecture associated with the OSPF. This includes a plurality of network processors 300a–f, each configured generally as shown in FIG. 2. The control point processor (CPP) 360 handles error conditions and communicates with all other CPPs in the grid system through OSPF protocols. For this purpose, the CPP receives information from the registers and timers in the network processors. With this data, the costs for various links are calculated, and the CPP uses these calculations to build and update the routing tables, which are then downloaded to the network processors. The CPP also serves as the interface between the NP and a network management platform. The size of the CPP generally would be determined by the peak bandwidth demands that it would be anticipated to handle in any given time interval.

The NP includes an aging mechanism whereby entries in a routing table that have not been used recently will age out and will be removed, thereby keeping the tables constantly updated and their size manageable.

There are certain structures built in to the existing OSPF algorithm running on the TCP/IP message protocol that can be applied to non-network applications, such as mapping the best route for an airplane, package or truck. Examples include:

1. "echo request" command which is used by the source to determine if a particular destination is up and running.

2. The OSPF "hello" command which is used by the source to determine if a destination is reachable given the existing routing information.

3. Nodes that are down beyond the immediate "next stop" are indicated by the "destination unreachable" ICMP message.

4. The OSPF "link status" request can be used to update routing information at one airport hub with the most current connection information from other airports.

5. If a particular airport hub is overloaded with traffic or construction on an interstate is creating a long traffic backup, the congested node can indicate this to the source with the "source quench" message. This indicates that a high cost is associated with sending additional traffic by this route because of the current congestion or back-up.

6. The OSPF "type of service" field can be used to indicate multiple service types to the same destination, e.g. first class, business class or coach service on the same airplane, or express mail versus normal delivery time for a package or letter.

7. If the network determines there is a more optimal (lower cost) route to send an airplane, truck or package, this can be indicated using the ICMP "Redirect" message which requests that the sender change its route and provides a more optimal destination.

8. The "time exceeded" ICMP message can be sent to the source to indicate that the planned route exceeds the cost stipulated as acceptable for this route.

9. The router solicitation message can be used to determine which airports, roads, hubs, etc. are available.

10. The OSP "Router Advertisement" message can be used to broadcast the availability of an airport or road that was previously closed.

There are also congestion control mechanisms built into the TCP/IP protocol using the "sliding windows" scheme. An example of using the sliding windows with airport traffic is that the window is the size of the number of planes that are currently scheduled to land at a particular airport, originating from a particular sending node. If the airport begins to become overloaded, it would send a message back telling the sender to reduce its window size using the "window advertisement" TCP/IP structure. This structure also provides a mechanism for sending "out of band" data, allowing the sender to designate certain messages as "urgent." These messages are to be processed as soon as they arrive, regardless of their position in the receiver's incoming queue. This mechanism would be useful to get emergency information to an airport if a plane is in trouble and needs to land immediately, regardless of its scheduled landing time.

A business process using the above-described routing application is described as follows. A customer arriving at the airport uses a credit card to check in and to get a boarding pass. This capability already exists within the SABER system used by most airlines/travel agents to book seats. The credit card identifies the customer to the computer and the computer software brings up the flight information and prints out the boarding passes. The current system does not cover situations in which the flights have been canceled or delayed and the customer needs to be rerouted.

By attaching the computer system to the network processor routing system described above, the system can check the route when given the particular flight numbers and determine if the flight was still valid. If one or more of the flights or legs of the flights have been canceled or delayed, this information can be presented to the customer on a video screen. The customer could also be presented with the option to reroute. The networking system could present alternative routes and their associated "cost" (time, fare $$) and present them to the customer on the video screen. In order to determine if seats were available on particular airplanes, the networking system would communicate with the existing SABER or other system. On selecting an option, the networking system can secure the seat by communicating with SABER and print out the appropriate boarding passes for the customer's new route. Any changes in the associated fare can then be charged to or credited against the customer's credit card.

This scenario prevents the customer from having to stand in line while the flight is rerouted. It also gives the customer options, other than the flights on the airplane on which the customer is currently booked. The networking system is able to present routes available on all airlines, not just the one the customer is currently using. This results in quicker or fewer connections, contrary to the incentive of the airline with which the customer is currently booked to not provide the customer with information concerning the shortest or least expensive reroute.

Following are two applications of this invention which require the performance capabilities of a Network Processor.

1. The simulation and control of the nationwide electrical power grid. Power is constantly being bought and sold across the U.S. power grid and is monitored and controlled on a second by second basis. This network could be actively controlled by the present invention.

2. The simulation and control (routing) of voice connections on the worldwide telecommunications network. The world of data is looking at carrying voice over the Internet (VoIP). The odd thing about this approach is that the Internet is carried by the long-distance voice network. The application of this invention to the routing of voice traffic over the voice network would allow the voice carriers to move their networks more towards the model of the current data networks which are based on OSPF routing. In addition, this application would allow better utilization and load balancing in the voice network.

Other uses of the present invention are the control and routing of air, truck and auto traffic, mail and package routing, inventory tracking and routing, and natural gas pipeline distribution. In fact, any arbitrarily large system (such as an airline, postal system, power system, voice network) can be modeled using Network Processors.

The IETF Open Shortest Path First (OSPF) algorithm running on the common control points can be utilized for determining the optimum route through any routed network, such as those mentioned above. Once the network is modeled and is initialized, a packet, sent from Node A to Node B, will be sent via the optimum route via OSPF. This optimum route can then be used, in the voice case, to physically set up the switch points along the path that the call is to take.

An enhancement to the simple embodiment above would be to model the network in a single CPU with a single NP off load engine, if the network is simple enough. A further enhancement would be to model the network in a single CPU with software in the CPU emulating each of the routers in the system.

This invention would enable new business opportunities for service providers in non-networking industries, such as the airlines industry, freight transport or voice communications services. The features of the present invention can be implemented solely with a software program that runs on hardware conventionally used by airlines, package deliverers and forwarders, mail carriers and other businesses involved in the distribution of large numbers of objects or persons from a variety of pickup points to a variety of destinations.

The invention also has various applications in connection with a global positioning system (GPS). For example, a GPS installed within a moving vehicle or aircraft can be used in connection with the National Institute of Science & Technology universal time stamping feature and the location feature of the GPS, to calculate precise speeds and to provide up-to-date cost information to the routing tables. The invention may also find use for the deployment of civilian and military supplies and personnel.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A system for moving an object along a path in a network grid from a source to a destination according to the OSPF routing algorithm, comprising:
    a) network processing capabilities at each node in the grid represented by intersecting paths, wherein the processing capabilities at each node comprise a network processor, one or more of the network processors is represented by a software simulator in a CPU, and the entire collection of network processor simulators and the common control point are within a single CPU or a CPU complex;
    b) a routing table for each of the network processing capabilities, the routing table comprising links with other nodes in the grid to which each of the network processing capabilities is interconnected;
    c) a cost factor associated with each link included in the table of each network processor;
    d) a procedure for setting a cost of infinity for any intersection that becomes unavailable; and
    e) the ability to build an alternative path for the object between the source and the destination that bypasses the unavailable intersection using the OSPF routing algorithm.

2. The system according to claim 1 further including additional links in the routing table with endpoint locations in the grid to which the network processor is interconnected.

3. A method of moving a non-data object along a path in a network grid from a source to a destination according to the OSPF routing algorithm, comprising the steps of:
    a) establishing network processing capabilities at each node in the grid represented by intersecting paths, wherein the processing capabilities at each node comprise a network processor, one or more of the network processors is represented by a software simulator in a CPU, and the entire collection of network processor simulators and the common control point are within a single CPU or a CPU complex;
    b) creating a routing table for each of the network processing capabilities, the routing table comprising links with other nodes in the grid to which each of the network processing capabilities is interconnected;
    c) inserting data by a common control point into the table of each network processor, said data representing a cost factor associated with each link that is created in step b;
    d) setting a cost of infinity for any intersection that becomes unavailable; and
    e) building at least one alternative path for the object between the source and the destination that bypasses the unavailable intersection using said routing algorithm.

4. The method according to claim 3 wherein the network processing capabilities at each node are handled by a network processor.

5. The method according to claim 4 including the further steps of creating additional links in the routing table with endpoint locations in the grid to which each of the network processors is interconnected, and inserting into the table of each network processor a cost factor associated with each link that is thus created.

6. The method according to claim 3 wherein the object being routed comprises mail, packages, or articles of manufacture.

7. The method according to claim 3 wherein the object being routed comprises electricity, crude oil, or natural gas.

8. The method according to claim 3 wherein the object being routed comprises a person.

9. The method according to claim 8 wherein the person is being routed on a mode of transportation selected from the group consisting of aircraft, trains, automobiles, buses and water vessels.

10. An object routing system including a network processor for use with an OSPF routing algorithm to move the object along a path in a grid from a source to a destination, said network processor including:
   a) at least one MAC layer;
   b) wide bandwidth busses for delivering information between said MAC layer and one or more physical layer devices supported by the network processor;
   c) an embedded Processor Complex (EPC) using one or more routing tables generated by the OSPF algorithm;
   d) an enqueue-dequeue up scheduler (EDS-UP) to process data packets received by said MAC layer from the physical layer devices, to store the headers from the packets and to forward the packets to a switch fabric to prioritize the export of the packet data;
   e) an enqueue-dequeue down scheduler (EDS-DN) to receive data packets from a switch fabric, said scheduler utilizing a traffic management function.

11. The system according to claim 10 wherein the traffic management function serves to route the packets received from a switch fabric through the other of the MAC layer to one or more output ports according to priority as directed by a switch fabric.

12. The system according to claim 11 including a scheduling data manager that delivers packets from the EDS-UP through a serial port to a switch fabric, and a scheduling data manager that receives packets from a switch fabric and delivers the packets to the EDS-DN.

13. The system according to claim 10 wherein the embedded processor complex is supported by SRAM and DRAM storage.

14. The system according to claim 13 wherein the network processor is embedded in a semiconductor chip, and the SRAM and DRAM are off-chip.

15. The system according to claim 10 wherein the network processor further includes a scheduling data manager function for resolving conflict of packet addresses going to a switch fabric, and for rerouting of packets from a switch fabric to the enqueue-dequeue down scheduler.

* * * * *